Aug. 7, 1951     R. G. BOCK     2,563,512
SLIDE RULE FOR INDICATING PRODUCTIVITY OF OPERATOR
OR MACHINE AND/OR THE QUALITY LEVEL OF A PROCESS
Filed Oct. 29, 1949
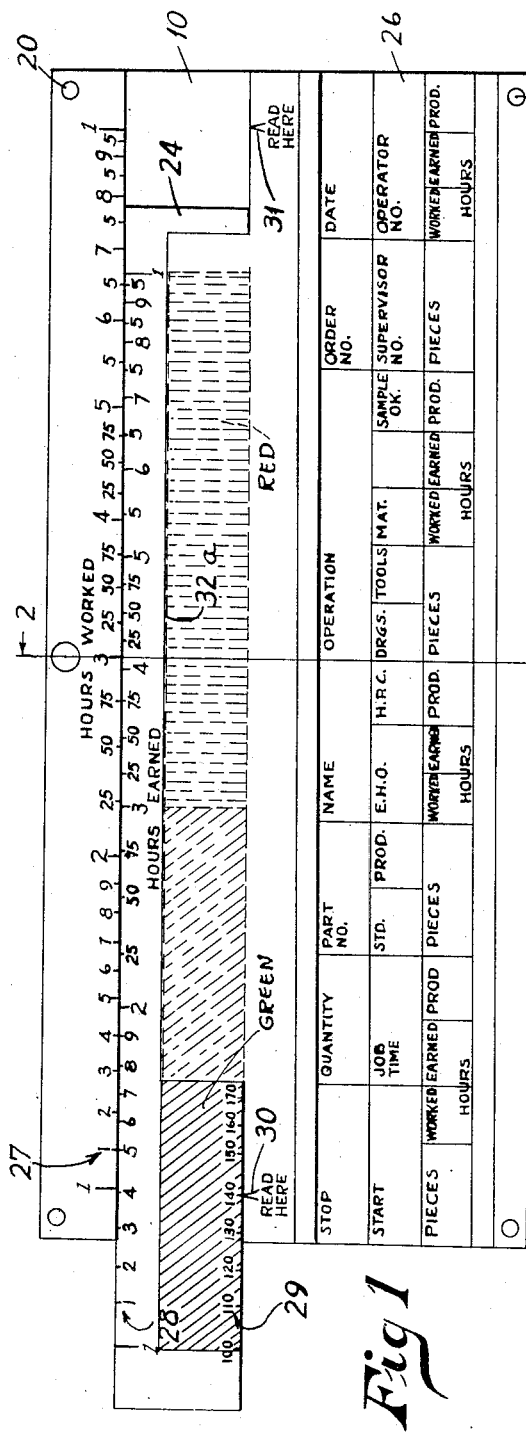
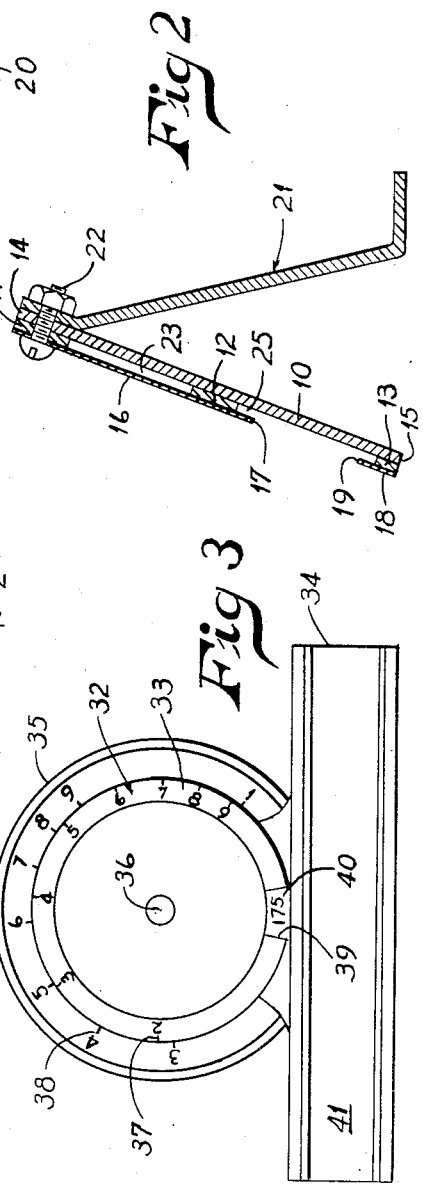
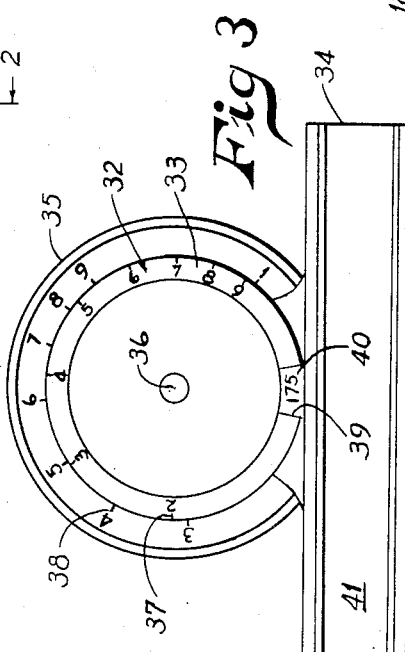
INVENTOR.
Richard G. Bock
BY
Charles P. Vojtech
Atty.

Patented Aug. 7, 1951

2,563,512

UNITED STATES PATENT OFFICE 2,563,512

SLIDE RULE FOR INDICATING PRODUCTIVITY OF OPERATOR OR MACHINE AND/OR THE QUALITY LEVEL OF A PROCESS

Richard G. Bock, Chicago, Ill.

Application October 29, 1949, Serial No. 124,390

3 Claims. (Cl. 235—70)

1

This invention relates to a slide rule device for indicating the productivity of an operator or machine while a job is running.

Economic manufacture requires that avoidable excess costs in the form of either time or material be recognized and corrective action taken when and wherever possible. Excess costs may result from improperly processed units, or may be in the form of excess time required to perform a given operation on a part or unit. Below standard performance may result from lack of skill or effort, ambiguous instructions, faulty material, machine or power failure, or from various other causes. An inspection is normally relied upon to disclose imperfections in parts produced. Quantities and time required are reported on an operator's time or machine report. Expected hourly output or hours per hundred pieces are determined as a standard representing a normalized performance expectancy. Ordinarily, below standard performance is not disclosed until it is too late to take corrective action. If the attention of both the operator and supervision can be directed to below standard performance while a job is running, corrective action may be taken to eliminate avoidable excess costs to the advantage of both labor and management. Below standard performance also penalizes an operator, because he does not earn the full planned potential of the job.

The principal object of this invention is to provide an indicating device which provides the workman and his supervisor with a frequent check of productivity while the job is running, so that necessary corrective action may be taken before the job is finished.

A specific object of this invention is to provide an indicating device which indicates the productivity of a workman by means of the magnitude and color of a semaphore.

A more specific object of this invention is to provide a slide rule which will indicate the productivity of an operator or a machine as a percentage of an established standard expectancy for the job.

A still more specific object of this invention is to provide a slide rule having a pair of logarithmic scales for the purpose of performing a comparison of one quantity, such as the actual hours worked, with another quantity, such as the earned hours for the job, with a third scale graduated in productivity percentages on the slide and read from reference points on the fixed portion of the slide rule.

A feature of this invention is a slide rule for indicating the productivity percentage of an operator or a machine with means for holding job instructions and/or a time ticket or the like from which the basic information for determining productivity can be obtained.

These and other objects and features of this invention will become apparent from the following detailed description when taken together with the accompanying drawings, in which Fig. 1 is a plan view of a slide rule made in accordance with this invention;

Fig. 2 is a section taken through line 2—2 of the slide rule of Fig. 1; and

Fig. 3 is a plan view of a modification of the slide rule of Fig. 1.

Referring now to the drawings, there is shown a plate 10 of rectangular form, the plate preferably being made of substantially rigid material such as one of the vinyl or melamine plastics, wood, cardboard, etc. If a plastic is used, it may be transparent or opaque, or it may be colored, if desired. Three spacer strips 11, 12 and 13 are located at the top, center and bottom, respectively, of the plate 10 and extend across the entire plate 10, parallel with one another and with one of the edges 14 or 15 of the plate. A relatively thinner and narrower plate 16 extends across strips 11 and 12 with the lower edge 17 overhanging strip 12. A strip 18 of substantially the same material as plate 16 is secured to strip 13 with its upper edge 19 overhanging strip 13.

The plate 16, strips 11, 12 and 13 and strip 18 are fastened to plate 10 by means of small rivets 20, so that the entire assembly may be handled as a unit. For easy readability from a distance or for locating on a flat surface, the slide rule is supported in a tilted position by a bracket 21 which is secured to plate 10 by a bolt 22. It is understood that if desired the slide rule may be suspended from a wall or a machine frame instead of being supported by bracket 21.

It will be observed that the construction thus far described will provide a longitudinal opening 23 and a holder 25. A slide 24 is inserted into opening 23, and a form 26 is inserted into holder 25, said holder having certain information to be hereinafter described. Slide 24 is preferably made of rigid material which may be a transparent vinyl plastic, similar to that used for plate 10 or any desired material capable of retaining its shape.

In order that the slide rule may perform its intended function, strip 11 is ruled off with lines and numerals corresponding to a logarithmic scale such as the "D" scale of an ordinary slide rule as shown at 27. An identical scale 28 is ruled off on slide 24, adjacent scale 27. Instead of reading the answer on scale 27, however, a third scale 29 is provided on the lower edge of slide 20; said third scale 29 being read directly in percent. Two index points 30 and 31 are provided on plate 16, one at each end of scale 29 when the latter is in its zero position. When slide 24 is moved to the left, as viewed in Fig. 1, the readings will be above 100%; when slide 24 is moved to the right, as viewed in Fig. 1, the readings will be below 100%.

Plate 16 is preferably rendered opaque in the area below line 32a, so that the portion of scale 29 beneath the opaque area is not visible. Only one side of scale 29 will be visible at a time. By coloring the percentages over 100 green and those under 100 red, a passing observer may be immediately alerted by the exposed color as to the conditions of the job. Thus the amount of the slide visible indicates the magnitude of the deviation from the standard expectancy, and the color of the exposed slide indicates whether the deviation is above or below the standard expectancy.

When the slide rule is used to indicate the productivity of an operator or machine, the upper scale 27 represents the actual hours worked by an operator or machine and the lower scale 28 represents the hours earned, that is, the hours that it should have taken the operator or machine to produce the pieces made as determined by standard performance expectancy previously established. By aligning these two quantities the productivity percentage of the operator is read directly on scale 29, either at index 30 or at index 31, depending upon whether the performance is above or below standard.

In order to make the information for scales 27 and 28 readily available, provision is made on insert 26 for recording pertinent data, such as Operator's Name, Operator's No., Date, Order No., Part No., Time Started, Time Stopped, Quantity of Pieces to be Produced, Job Time, Standard Job Expectancy (Expected Hourly Output), Sample Inspection, Supervisor's No. and other data necessary or desirable for job instructions and/or cost and production control purposes. The net results read from scale 29 are periodically recorded as well as the Number of Pieces, Hours Worked, Hours Earned and Productivity (in percent) in order that the progress of the operator may be followed to determine whether an undesirable condition has been corrected. It is also contemplated that insert 26 may be used as a cost record and may be filed away in the manner usually employed for time or production reports. Data specific to the needs of a particular manufacturer may be recorded on the insert form in place of, or in addition to, the data shown and described herein.

The insert 26 is periodically filled in by the timekeeper or foreman's clerk and the scales 27 and 28 are manipulated by the job supervisor. The rule is placed so that it can be seen by the operator, as well as by his supervisor, and hence if the indicated productivity is below 100% for reasons beyond the control of the operator, his supervisor upon questioning the operator can take whatever steps are necessary for corrective action to bring productivity back to 100%. Such needed corrections, if known, can be made while the job is running, thereby saving lost time.

The slide rule may also take the form shown in Fig. 3 where circular scales are used instead of the rectilinear scales of Fig. 1. Thus the slide rule may be comprised of a rigid plate 32, having a disc 33 formed in its upper region and a rectangle 34 formed in its lower region. A second disc 35 is pivotally mounted at the center 36 of disc 33 so as to be rotatable concentrically relative to said disc 33. Logarithmic scales 37 and 38 are ruled off on discs 33 and 35, respectively, said scales corresponding to scales 27 and 28, respectively, of the rule shown in Fig. 1. Thus scale 37 represents the "Hours Worked" and scale 38 represents the "Hours Earned." Disc 33 is preferably opaque, but is provided with a window 39 through which is visible a "Percent Productivity" scale 40 which is ruled off on disc 35 on a circle concentric with scales 37 and 38.

Thus by turning disc 35 to align the "Hours Worked" with the "Hours Earned," the productivity percentage of the operator may be read directly on scale 40. The percentages over 100 may be colored green and those under 100 may be colored red.

The data from which the operator's productivity is determined may be obtained from an insert 41, indicated generally on Fig. 3 and having a form substantially identical with that of form 26. Said insert 41 is retained in a holder formed in rectangular region 34 in the same manner as holder 25 of the Fig. 1 form.

The opaque portions of both forms may contain printed matter pertaining to the purpose of the slide rules, or explanatory of the manner in which the rules may be used.

The slide rules described above point out to both labor and supervision whether the standard job expectancy is being met and provides an unbroken working coordination between the operator and supervision and engineering. It makes possible the taking of corrective action in time to overcome avoidable excess costs and can, in fact, by disclosing below standard performance while the job is running, stop such avoidable excess costs before they occur.

It is understood that the foregoing description is illustrative of preferred embodiments of this invention and that the scope of the invention is not to be limited thereto, but is to be determined by the appended claims.

What is claimed is:

1. A slide rule for indicating the percent productivity of an operator or machine, said rule comprising a frame, means mounted on the frame for relative movement with respect to the frame and comprising a substantially rectangular slide, a pair of identical logarithmic scales, one on the frame and one on the slide immediately adjacent the scale on the frame, another scale on the slide graduated in percent productivity, means on the frame for concealing all but the end regions of the percent productivity scale and index means on the frame at each end of the concealing means for reading the percent productivity scale, said scale graduated in percent productivity being colored red over the portion representing percentages less than 100 and green over the portion representing percentages over 100.

2. A slide rule for indicating the deviation from normal quantity or quality level of production of an operator or machine, said rule comprising a frame member having a guide thereon, a slide operating in the guide, a pair of logarithmic scales, one on the slide and the other on the frame adjacent the first scale from which the deviation from normal may be calculated, said frame member covering the slide and being opaque except over the portion of the slide containing the logarithmic scales, one-half of the slide under the opaque portion of the frame being colored red and the other one-half under the said opaque portion being colored green, the red half being exposed in proportion to the deviation below normal and the green half being exposed in proportion to the deviation above normal.

3. A slide rule as described in claim 2, and means on the rule for supporting the rule from a machine or the like with the colored portion of the slide in a substantially vertical position.

RICHARD G. BOCK.

REFERENCES CITED

The following references are of record in the file of this patent:

UNITED STATES PATENTS

| Number | Name | Date |
|---|---|---|
| 946,908 | Meyer | Jan. 18, 1910 |
| 1,404,951 | Frankel | Jan. 31, 1922 |
| 1,454,104 | Caldwell | May 8, 1923 |
| 1,563,284 | Laurin | Nov. 24, 1925 |
| 1,568,475 | Schwanda | Jan. 5, 1926 |
| 1,569,770 | Malan | Jan. 12, 1926 |
| 2,006,945 | Doble | July 2, 1935 |
| 2,303,018 | Bucklin | Nov. 24, 1942 |

OTHER REFERENCES

Pages 7 and 19-29 of "Special Slide Rules" by J. N. Arnold, published by Purdue University at La Fayette, Indiana, in September 1933.